US008761052B2

(12) United States Patent
Wang et al.

(10) Patent No.: US 8,761,052 B2
(45) Date of Patent: Jun. 24, 2014

(54) METHOD FOR FORWARDING PROTOCOL FRAMES IN SPANNING RINGS AND A SHARED NODE OF MULTI-RINGS IN THE ETHERNET (75) Inventors: Bin Wang, Shenzhen (CN); Shaoyong Wu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 484 days.

(21) Appl. No.: 13/119,623

(22) PCT Filed: Dec. 29, 2008

(86) PCT No.: PCT/CN2008/002121
§ 371 (c)(1),
(2), (4) Date: Mar. 17, 2011

(87) PCT Pub. No.: WO2010/031210
PCT Pub. Date: Mar. 25, 2010

(65) Prior Publication Data
US 2011/0176550 A1    Jul. 21, 2011

(30) Foreign Application Priority Data

Sep. 17, 2008 (CN) .......................... 2008 1 0149325

(51) Int. Cl.
H04L 12/28 (2006.01)
(52) U.S. Cl.
USPC ........... 370/256; 370/216; 370/217; 370/221; 370/223; 370/224; 370/225; 370/241; 370/242; 370/245; 370/248
(58) Field of Classification Search
None
See application file for complete search history.

(56) References Cited

U.S. PATENT DOCUMENTS

| 6,496,484 | B1 * | 12/2002 | Suzuki .......................... 370/254 |
| 7,313,088 | B2 * | 12/2007 | Mazzurco et al. ............ 370/217 |
| 7,680,950 | B1 * | 3/2010 | Slaughter et al. ............. 709/238 |
| 2007/0201475 | A1 * | 8/2007 | Li et al. ......................... 370/392 |
| 2009/0092146 | A1 * | 4/2009 | Hargrave et al. ............. 370/428 |
| 2009/0168671 | A1 * | 7/2009 | Holness et al. ............... 370/256 |

FOREIGN PATENT DOCUMENTS

| CN | 1909496 A | 2/2007 |
| CN | 101075935 A | 11/2007 |

* cited by examiner

Primary Examiner — Ian N Moore
Assistant Examiner — Eric H Wang
(74) Attorney, Agent, or Firm — McGarry Bair PC (57) ABSTRACT The present invention provides a method for forwarding a protocol frame in spanning rings, applied to the Ethernet ring network including a crossed or tangent ring and sub-ring. The method comprises steps as follows: when an interconnection node of the ring and the sub-ring receives a protocol frame from a sub-ring, if the topology of the sub-ring is changed, the interconnection node updates its address forwarding table according to the address updating information carried in the protocol frame, and sends the address updating information to the ring; the nodes of the ring update their address forwarding table respectively according the updating information. The present invention selectively sends information of sub-ring protocol frame to the ring via the interconnection node of the ring and the sub-ring. Such scheme that information of the sub-ring protocol frame is selective sent at the interconnection node not only solves the problem of updating address in spanning rings, but also decreases the amount of protocol frames sent from the sub-ring to the ring, and thereby greatly improves the performance and efficiency of the network.

6 Claims, 7 Drawing Sheets

Fig. 5

METHOD FOR FORWARDING PROTOCOL FRAMES IN SPANNING RINGS AND A SHARED NODE OF MULTI-RINGS IN THE ETHERNET

CROSS-REFERENCE TO RELATED APPLICATIONS

This application is a National Phase application of International Application No. PCT/CN2008/002121, filed Dec. 29, 2008, which claims the benefit of Chinese Patent Application No. 200810149325.0, filed Sep. 17, 2008, both of which are incorporated herein by reference in their entirety.

FIELD OF THE INVENTION

The present invention relates to data communication field, especially to an interconnection node and a method for a sub-ring of multi-rings in the Ethernet forwarding protocol frames to a ring through interconnection nodes.

BACKGROUND

In the practical application of the Ethernet network, various protection technologies are widely utilized to realize the redundancy backup between a main path and an alternate path. When both of the main path and alternate path are in good condition, the protection data forwarding function of the alternate path is blocked, and the protection data among networks are transmitted on the main path; when the main path is out of order, the protection data forwarding function of the alternative path is unblocked, and the protection data among the network are transmitted on the alternate path, so as to avoid the protection data being received repeatedly and forming the broadcast storm in the normal state of the network; when the main path of the network is out of order, the alternate path is invoked to transmit the protection data in order to improve the anti-fault capability of the Ethernet, and to satisfy the high real time requirement that convergence time should be less than 50 ms when the handover is performed.

Figure 1A:
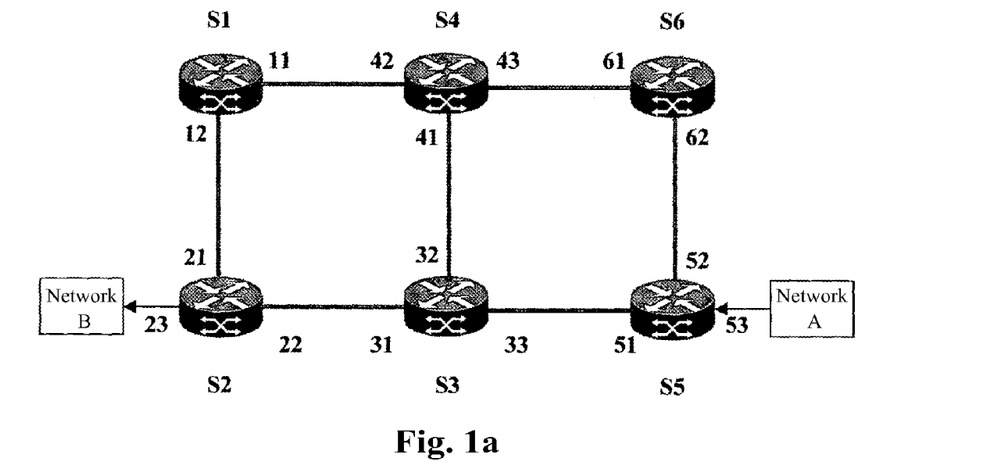
FIG. 1a is the topological diagram of the Ethernet multi-ring network in the prior art.

Taking the Ethernet multi-rings protection technology for example, as shown in FIG. 1a, nodes S1 to S6 are Ethernet switches, and Network B is connected with node S2, Network A is connected with node S5. A communication process is performed between Network A and Network B. There are four physical paths between Network A and Network B, viz. Network A<->node S5<->node S3<->node S2<->Network B, Network A<->node S5<->node S3<->node S4<->node S1<->node S2<->Network B, Network A<->node S5<->node S6<->node S4<->node S3<->node S2<->Network B, Network A<->node S5<->node S6<->node S4<->node S1<->node S2<->Network B.

When the Ethernet multi-ring protection technology is applied, a ring and a sub-ring are adopted generally. The ring is a whole Ethernet ring, and the sub-ring is an Ethernet ring connected with another ring or network through an interconnection node. The interconnection node, which is also called as a shared node, is a public node belonging to two or more Ethernet rings at the same time.

Figure 2A:
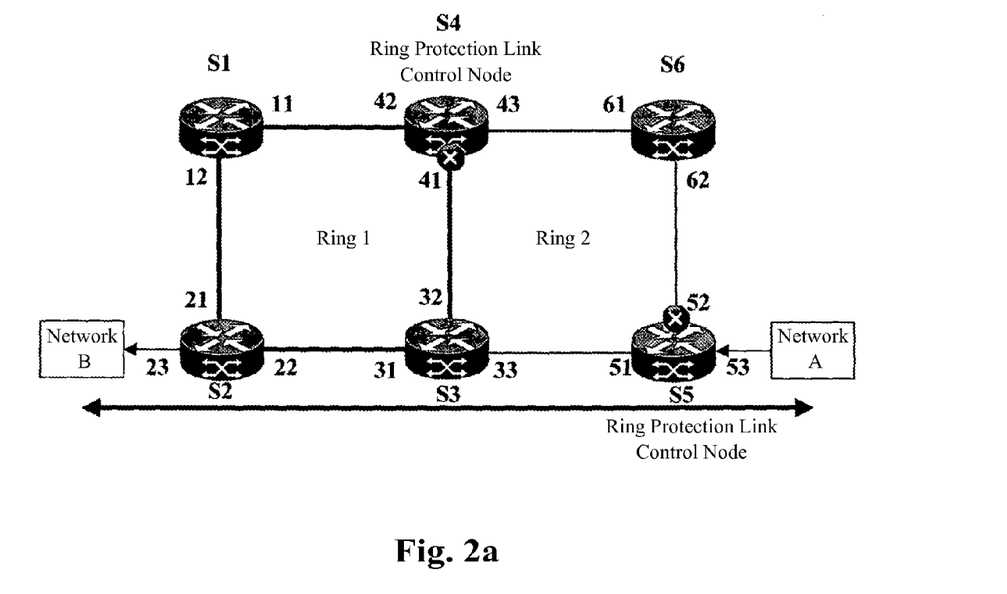
FIG. 2a is the topological diagram of the communication path when the link of the Ethernet multi-ring network in the prior art is in good condition.

As shown in FIG. 2a, it includes a ring and a sub-ring, and the Ring 1 is a ring, Ring 2 is a sub-ring. Ring 1 includes nodes as below: S1, S2, S3, and S4, and includes links as below: <S1,S2>, <S2,S3>, <S3,S4>, and <S4,S1>. Ring 2 includes nodes as below: S3, S5, S6, and S4, and includes links as below: <S3, S5>, <S5, S6>, and <S6, S4>. It should be specially noted that link <S3, S4> belongs to Ring 1 but not Ring 2. In the above, node S3 and node S4 are interconnection nodes of Ring 1 and Ring 2, Port 33 of node S3 and Port 43 of node S4 belongs to Ring 2, which are called as access port.

Figure 2B:
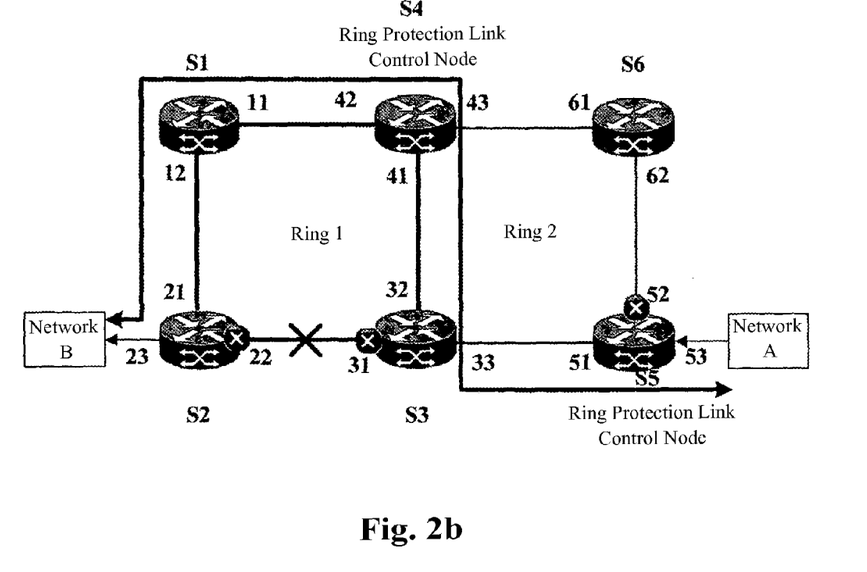
FIG. 2b is the topological diagram of the communication path when the link of the Ethernet multi-ring network in the prior art has a fault.

In the ring network, when the ring network is in good condition, a link in a ring should be in a blocked status for forwarding the data message to prevent forming a ring, wherein the link is called as ring protection link (or always blocked link etc.); by the ring protection link, it is involved in the performing of the handover between the main path and alternate path in a ring. The node having a ring protection link is called as ring protection link control node herein. As shown in FIG. 2b, in Ring 1, node S4 is a ring protection link control node, and the link directly connected with Port 41 of node S4 is the ring protection link of Ring 1. In Ring 2, node S5 is a ring protection link control node, and the link directly connected with Port 52 of node S5 is the ring protection link of Ring 2. In normal situation, the ring protection link control node of Ring 1 and Ring 2 blocks the data forwarding function of their secondary ports, to avoid the protection data being forwarding repeatedly and forming a broadcast storm.

When the links of Ethernet ring network is in good condition, the ring protection link control nodes of the ring and the sub-ring block the protection data forwarding function of the secondary ports. As shown in FIG. 2a, node S4 blocks the protection data forwarding function of Port 41, node S5 blocks the protection data forwarding function of Port 52, and the communication path between network B and network A is: Network B<->node S2<->node S3<->node S5<->Network A.

When the link of the Ethernet multi-ring network has a fault, if the fault link is not a protection link, the ring protection link control node unblocks the protection data forwarding function of the secondary port, each node updates its address forwarding table respectively and the transmission of communication among the networks is according to the new path. As shown in FIG. 2b, the link ⟨S2, S3⟩ of Ring 1 has a fault; when detecting the link fault, the node S2 and node S3 block the data forwarding function of port 22 and port 31 respectively, and inform other nodes that the link has a fault. After receiving the fault notification, node S4 (the ring protection link control node) unblocks the protection data forwarding function of port 41, and each node on Ring 1 will update the address forwarding table. The new communication path between Network B and Network A is: Network B<->node S2<->node S1<->node S4<->node S3<->node S5<->Network A.

When the link of the Ethernet multi-ring network is recovered, a recovery handover is performed, and the network transmission resumes the transmission path in the normal state. Due to the path change, their nodes need to update the address forwarding tables.

In addition, if the nodes of the sub-ring update their address, but the nodes of the ring do not update their address, some problems as below may occur.

Figure 2C:
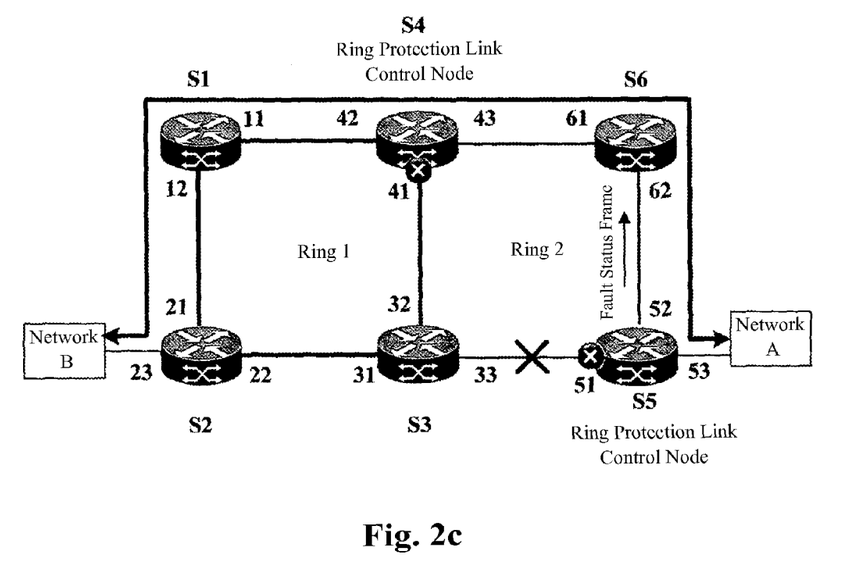
FIG. 2c is the topological diagram of the communication path when the link of the sub-ring of the Ethernet multi-ring network in the prior art has a fault.

For example, in FIG. 2c, When the Ethernet multi-ring network is in good condition, the communication path between network B and network A is: Network B<->node S2<->node S3<->node S5<->Network A. When the link of the sub-ring Ring 2 has a fault, e.g., the link <S3,S5> has a fault as shown in FIG. 2c, after detecting the link corresponding to ports 51 has a fault, node S5 updates its address forwarding table, blocks the protection data forwarding function of Port 51, unblocks the protection data forwarding function and sends fault status frame outwardly. After receiving the fault status frame, node S6 updates the address forwarding table, and a new communication path between network A and Network B is formed. After node S5 and node S6 update the table forwarding table, the protection data sent from Network A to Network B can arrive at Network B through the broadcast of node S5 and node S6, and meanwhile, each node learns the address of Network A. But before Network A sends data to network B, if Network B sends data to Network A, a lot of packages may be lost; the reasons of the above is as follows: the node S2 hasn't updated the address forwarding table; there are still the items before the path handover in the address forwarding table, i.e. the wrong address item; the protection data sent from Network B to Network A is still forwarded according to the wrong address forwarding table, i.e., the data is sent from the output port 22 of node S2, and actually, these data will not arrive at Network A because of link fault and port blocking; as long as the switch learns the correct address output port of Network A, the data can arrive at Network B. Thus, the path handover time sent from Network B to Network A depends on whether there is traffic from Network A to Network B, and the time is always beyond 50 ms. When the Ethernet ring path performs a recovered protection handover, the communication between Network A and Network B also has the similar problem.

From the above analysis, it can be seen that when a link of a sub-ring has a fault, the sub-ring needs to inform nodes in the ring to update the address forwarding table by sending a protocol frame to the ring via the interconnection node. Therefore, it is very significant to provide a method that the interconnection node selective sends an address updating notification frame of a sub-ring to the ring.

SUMMARY OF THE INVENTION

The technical problem to be solved in the present invention is to provide an interconnection node and a method for forwarding a protocol frame in spanning rings, which solves the problem of updating a new address in spanning rings, decreases the amount of protocol frames sent from a sub-ring to a ring, and thereby greatly improves the performance and efficiency of the network.

To solve above problem, a method of forwarding a protocol frame in spanning rings of the present invention, which is applied to the Ethernet ring network including a crossed or tangent ring and sub-ring, comprises: when an interconnection node of the ring and the sub-ring receives a protocol frame from a sub-ring, if the topology of the sub-ring is changed, the interconnection node updates its address forwarding table according to the address updating information carried in the protocol frame, and sends the address updating information to a ring; and the nodes of the ring update their address forwarding table respectively according the address updating information.

Furthermore, that the topology of the sub-ring is changed means that the status information carried in the protocol frame is not consistent with the status information lately recorded by the interconnection nodes.

Furthermore, the interconnection node sends the address updating information to the ring by following manners: the interconnection node generates an address updating message according to the address updating information, and sends the message to the ring for N times continuously, wherein, N is greater than or equals to 3.

Furthermore, when the status information carried in the protocol frame received by the interconnection node is not consistent with the status information recorded lately by the interconnection node, the interconnection node updates its recorded status information according to the status information carried in the protocol frame received.

Furthermore, when the status information carried in the protocol frame received by the interconnection node is not consistent with the status information recorded lately by the interconnection node and the protocol frame does not carry the address updating information, the interconnection node ignores the protocol frame and does not forward the protocol frame to the ring.

Furthermore, if the status information carried in the protocol frame received by the interconnection node is consistent with recorded status information of previous protocol frame, the interconnection node does not forward the information of the protocol frame of the sub-ring to the ring.

Furthermore, the status information carried in the protocol frame indicates the sub-ring is in normal status or in fault status.

Furthermore, the protocol frame of the ring and the protocol frame of the sub-ring are transmitted on the ring control channel and sub-ring control channel respectively.

Furthermore, an interconnection node, applied to the Ethernet ring network which includes a crossed or tangent ring and a sub-ring, comprises: a first detecting and recording module, a second detecting module, a processing and sending module, and a receiving module; wherein, the receiving module is configured to inform the first detecting and recording module when receiving a protocol frame from a sub-ring control channel;

the first detecting and recording module is configured to detect the status information carried in the protocol frame, if the status information is not consistent with status information recorded lately by the first detecting and recording module, update its recorded status information according to the status information carried in the protocol frame, and inform the second detect module of the protocol frame;

the second detecting module is configured to detect whether the protocol frame carries the address updating information, and if yes, inform the processing and sending module;

the processing and sending module is configured to update an address forwarding table according to the address updating information in the protocol frame, and send the address updating information to the ring.

Furthermore, the interconnection node sends the address updating information to the ring by following manners: the interconnection node generates an address updating message according to the address updating information, and sends the message to the ring for N times continuously, wherein, N is greater than or equals to 3.

Furthermore, the first detecting and recording module does not make any process if detecting that the status information is consistent with its recorded status information in the previous protocol frame.

Furthermore, the second detecting module does not make any process if detecting that the protocol frame does not carry the address updating information.

Furthermore, the first detecting and recording module learns that the sub-ring is in a normal status or a fault status by detecting the status information carried in the protocol frame.

Compared with the prior art, the present invention selectively sends information of sub-ring protocol frame to the ring via the interconnection node of the ring and the sub-ring. The scheme that the information of the sub-ring protocol frame is selective sent at the interconnection node not only solves the problem of updating the address in spanning rings, but also decreases the amount of protocol frames sent from the sub-ring to the ring, and thereby greatly improves the performance and efficiency of the network.

DETAILED DESCRIPTION OF THE PREFERRED EMBODIMENTS

In order to solve the problems in the traditional technical solution, an interconnection node and a method for forwarding protocol frames in spanning ring of the present invention are further described through the following specific embodiments. The preferred embodiments are herein described in detail, which should not be considered as the limit for the present invention.

Embodiment 1 describes the operation process of the interconnection node sending updating information carried in the protocol frame of the sub-ring to the ring.

Figure 3A:
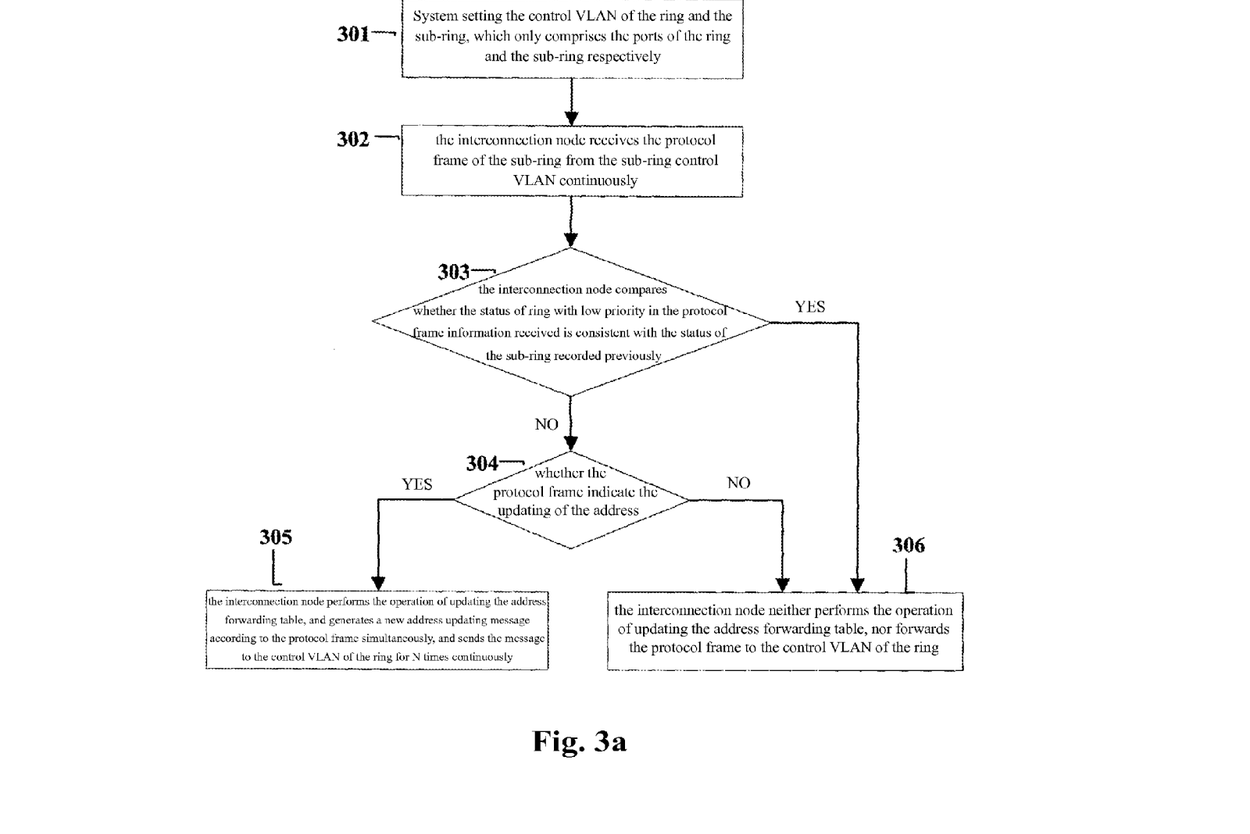
FIG. 3a is a special flow chart of the embodiment of the present invention.

As shown in FIG. 3a, it is the operation flow diagram of the interconnection node in the Ethernet multi-ring network sending updating information carried in the protocol frame of the sub-ring to the ring, including following specific steps.

Step 301, configuring a ring control channel and a sub-ring control channel in the Ethernet multi-ring network.

Figure 3B:
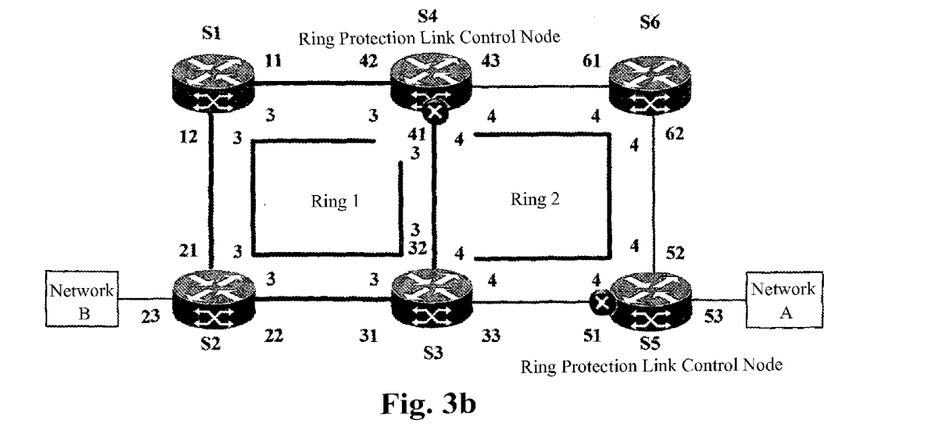
FIG. 3b is a schematic diagram of the ring and the sub-ring control VLAN of the Embodiment 1 of the present invention.

For example, in FIG. 3b, the control channels of a ring (Ring 1) and a sub-ring (Ring 2) are implemented by VLAN 3 and VLAN 4 respectively. VLAN 3 includes nodes as below: node S1, node S2, node S3, and node S4; VLAN 4 includes nodes as below: node S3, node S5, node S6 and node S4. Node S4 is a ring protection link control node of Ring 1, the link directly connected with Port 41 of node 41 is the ring protection link of the ring. If there is no fault in Ring 1, Port 41 of node S4 blocks the forwarding of the protocol frame of VLAN 3. Node S5 is the ring protection link control node of Ring 2, the link directly connected with Port 51 of node S5 is the ring protection link of the ring. If there is no fault in Ring 2, the secondary Port 51 of node S5 does not block the forwarding of the protocol frame of VLAN 4.

Step 302, the interconnection node of the ring and the sub-ring receives protocol frames of the sub-ring from a control channel of the sub-ring continuously, and the interconnection node analyzes whether the protocol frame is the latest protocol frame carrying address updating information, wherein the specific analysis method is as following steps.

Step 303, the interconnection node compares whether status information (indicating normal status or fault status), indicating the sub-ring status and being carried in the protocol frame received, is consistent with its status information recorded lately, i.e. whether the topology of the sub-ring is changed; if they are consistent with each other, Step 306 is carried out, otherwise, Step 304 is carried out.

Step 304, updating the status information recorded by the interconnection node according to the status information carried in the protocol frame received, and then the interconnection node further determines whether the protocol frame carries the address updating information; if the protocol frame does not carry the address updating information, Step 306 is carried out, otherwise Step 305 is carried out.

Step 305, when the interconnection node receives a protocol frame carrying latest address updating information from the sub-ring control channel, the interconnection node updates the address forwarding table, and generates a new address updating message according to the address updating information carried in the protocol frame, sends the message to the control channel of the ring for N times continuously, wherein N is greater than or equal to 3; when the node in the ring receives the address updating message, the address forwarding table is updated.

Figure 3C:
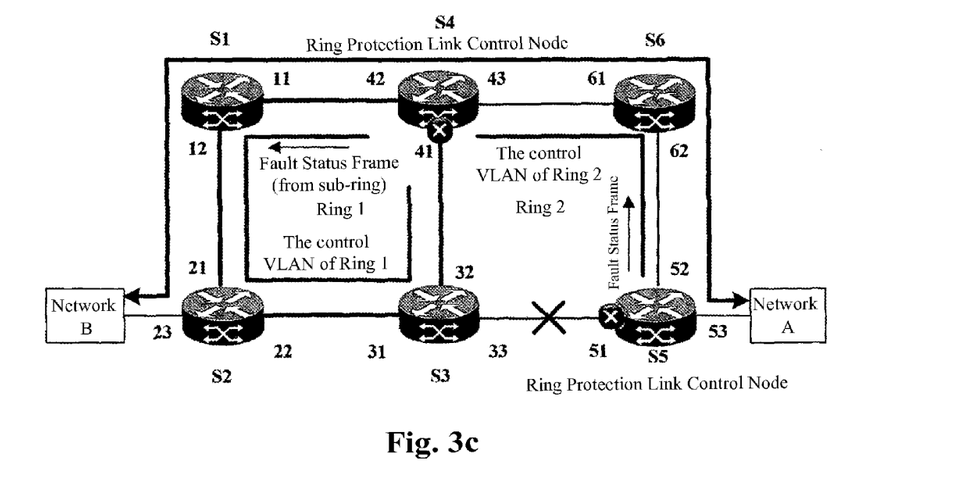
FIGS. 3c and 3d are a schematic diagram of the Embodiment 1 of the present invention in various scenes.

For example, as shown in FIG. 3c, the link ⟨ S3, S5⟩ of the sub-ring has a fault; after detecting that the link corresponding to port 51 has a fault, node S5 updates address forwarding table, blocks the protection data forwarding function of port 51, unblocks the protection data forwarding function of port 52, and sends fault status frame outwardly and periodically on the sub-ring control channel (realized by the control VLAN). After receiving the protocol frame from input port 43, the interconnection node S4 detects whether the status information of the sub-ring carried by the fault status frame (indicating the sub-ring is in a normal status or a fault status) is consistent with the status of the sub-ring recorded lately by node S4. If not consistent, it is illustrated that the fault status frame is a new fault protocol frame, and node S4 updates the address forwarding table, and generates an address updating message according to the address updating information carried in the fault status frame, and forwards the address updating message to the control channel of the ring (realized by the control VLAN) for transmission; otherwise it is illustrated that the fault status frame is not a new fault protocol frame, and node S4 ignores the frame, neither updating the address forwarding table, nor sending the fault status frame to the ring.

Step 306, if the sub-ring protocol frame received by the interconnection node does not carry the address updating information or the protocol frame is not the latest protocol frame (i.e. the status information carried in the protocol frame is not consistent with the status information recorded lately by the interconnection node), the interconnection node ignores this frame, neither updating the address forwarding table, nor sending the protocol frame to the ring.

Figure 3D:
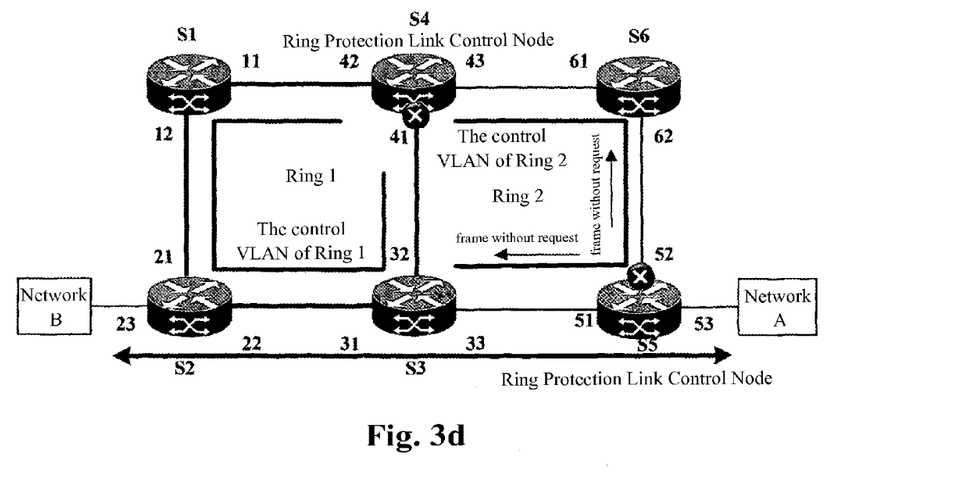

For example, in FIG. 3d, both of sub-ring Ring 2 and ring Ring 1 are in good condition, their control channel are realized by VLAN, node S4 blocks the protection data forwarding function of Port 41, and node S5 blocks the protection data forwarding function of Port 52, but doesn't block the transmission of the protocol frames of control VLAN of Ring 2. Control node S5 of Ring 2 sends a protocol frame without request periodically on the sub-control VLAN along the two ports of the ring, and the protocol frame doesn't carry the address updating information. When receiving the protocol frame from input ports, interconnection nodes S3 and S4 don't update the address forwarding table, and don't send such protocol frame without address updating information to the control VLAN of Ring 1.

A practical application example is descried.

In a certain Ethernet multi-ring network, an interconnection node process a protocol frame of the sub-ring by applying the method provided in the present invention.

Figure 4A:
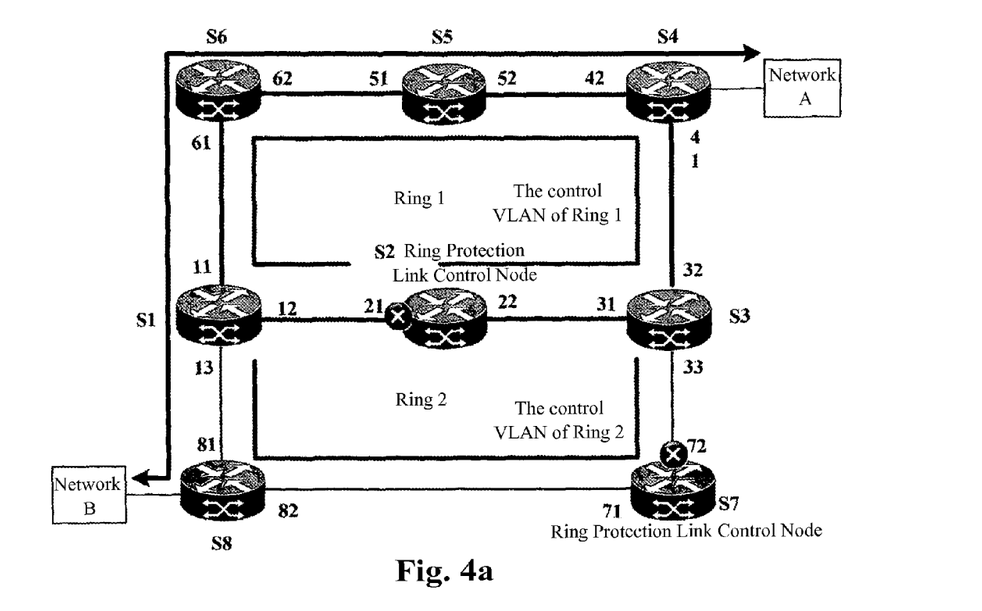
FIGS. 4a, 4b, 4c, and 4d are the schematic diagram of the practical application of performing the Ethernet ring network protection by applying the present invention.

As shown in FIG. 4a, Network A is connected with Network B via an Ethernet multi-ring network, and the Ethernet multi-ring network is composed of ring Ring 1 and sub-ring Ring 2. Ring 1 includes nodes as bellow: S1, S2, S3, S4, S5 and S6. When the ring does not have any fault, the secondary port 21 of node S2 (ring protection link control node) of Ring 1 not only blocks data messages, but also blocks the control VLAN of Ring 1. The control VLAN of Ring 1 includes all ports of Ring 1, and is a transmission channel of the protocol frame of Ring 1; Ring 2 includes nodes as bellow: S1, S8, S7 and S3. When the Ring 2 does not have any fault, the secondary port 72 of node S7 (ring protection link control node) of Ring 2 blocks the forwarding of data messages, but not blocks the control VLAN of Ring 2. The control VLAN of Ring 2 includes all ports of Ring 2, and is a transmission channel of the protocol frame of Ring 2.

Figure 4B:
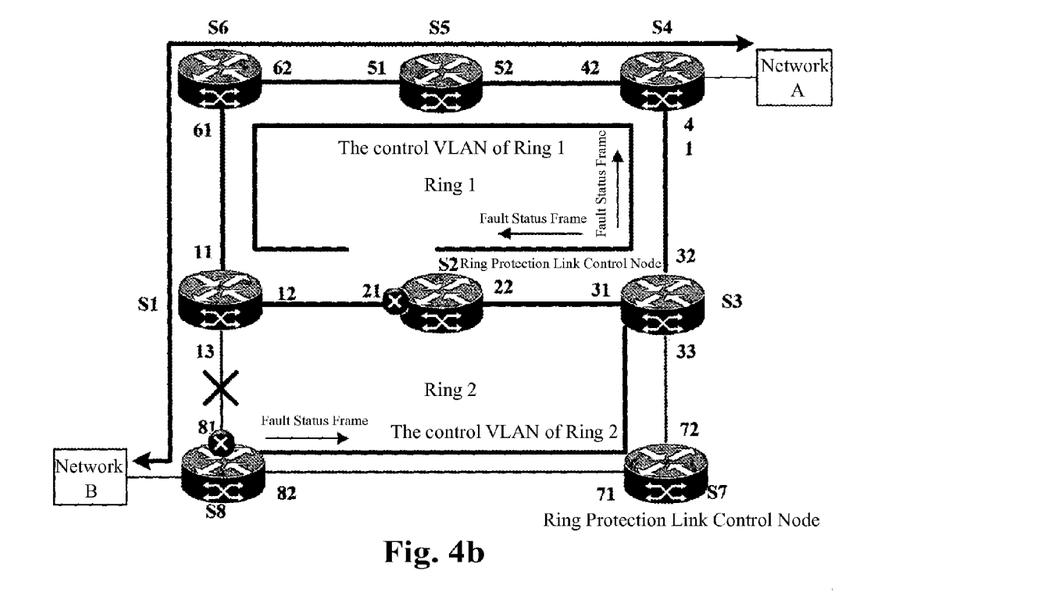

As shown in FIG. 4b, when the link ⟨S1,S8⟩ of sub-ring Ring 2 has a fault, after detecting the link fault, node S8 blocks the protection data forwarding function of port 81, updates the address forwarding table, and sends a fault status frame on the control VLAN of Ring 2, the fault status frame carrying address updating information. In addition, node S7 of Ring 2 (ring protection link control node) also unblocks the data forwarding function of the secondary Port 72.

After interconnection node S3 receives the fault status frame, by applying the method provided in the present invention, it determines that the fault status frame received is a latest fault status frame carrying the address updating information in Ring 2, and updates the status information recorded by it according to the status information carried in the fault status frame; the interconnection S3 updates the address forwarding table, and sends the latest fault status frame to the control VLAN of Ring 1 for transmission, so as to update the address forwarding table of nodes on the ring. The interconnection node S3 ignores the same fault status frames which periodically arrive subsequently, and don't send them to the control VLAN of Ring 1.

Figure 4C:
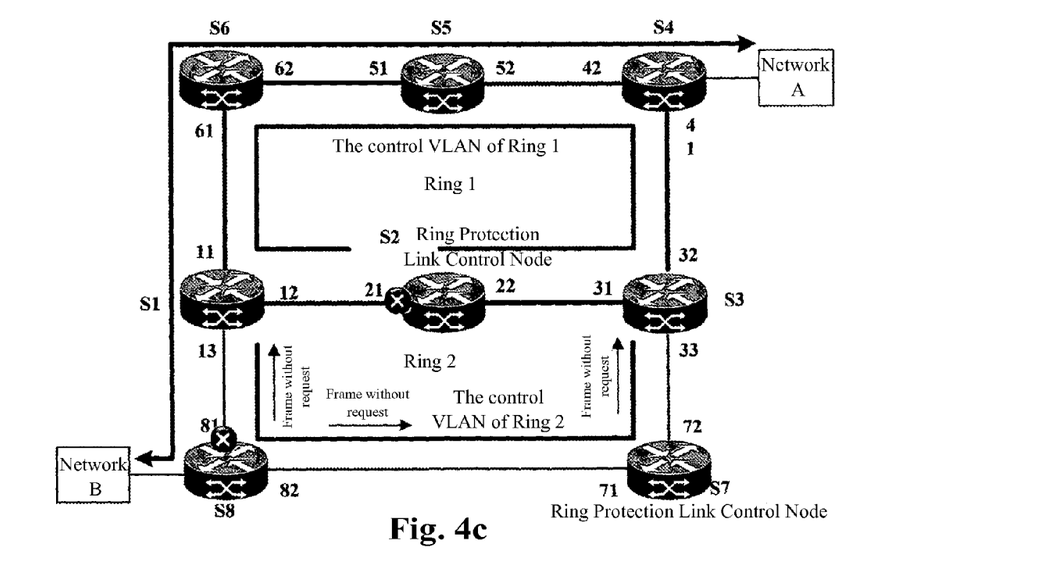

As shown in FIG. 4c, when the fault of link ⟨S1,S8⟩ of sub-ring Ring 2 disappears, after detecting that the link is recovered, node S8 continues to block the protection data forwarding function of port 81, and sends a protocol frame without any request on the control VLAN of Ring 2 periodically, wherein the protocol frame doesn't carry address updating information.

When receiving the frame without request from Ring 2, interconnection nodes S1 and S3 update the status information recorded by them according to the status information carried in the frame without request, and the interconnection nodes determine that the protocol frames received do not carry address updating information. Nodes S1 and S3 don't forward these protocol frames to the control VLAN of Ring 1.

Figure 4D:
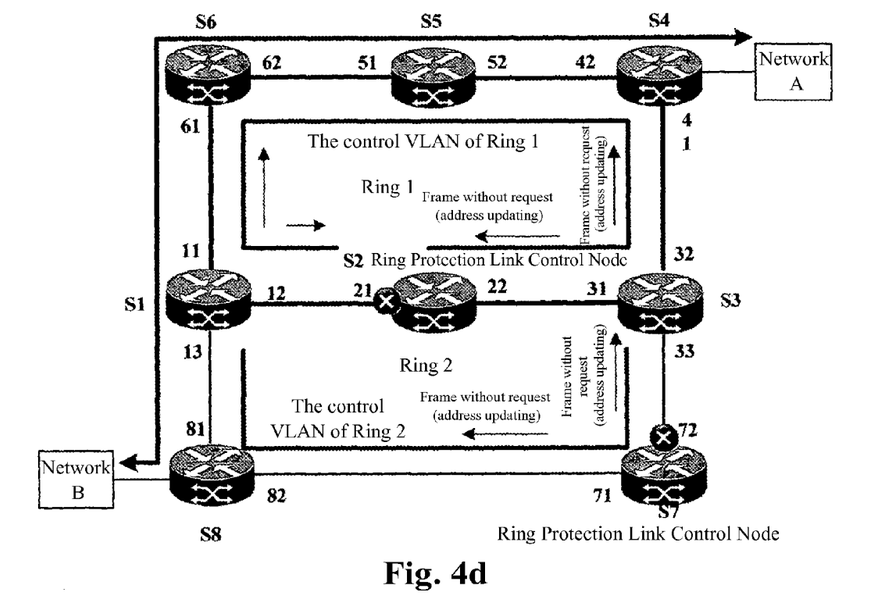

As shown in FIG. 4d, after node S7 (ring protection link control node) of Ring 2 receives the protocol frame without request sent from node S8, a WTR timer is initiated (in order to avoid the data loss due to the dithering of the fault link just recovered occurred in the preliminary stage, setting a timer, and still keeping the ring protection link unblocked in the period). When the WTR timer expires, the secondary Port 72 of the ring protection link control node blocks the forwarding of the data message, updates the address forwarding table, and periodically sends frame without request carrying the address updating information on the control VLAN of Ring 2. After receiving the frame, node S8 stops sending the original frame without request, updates address forwarding table, and unblocks the data forwarding function of Port 81.

After interconnection nodes S1 and S3 receive the frame without request from the ring protection link control node, by applying the method provided in the present invention, the interconnection nodes determine that the frame without request received is the latest protocol frame carrying address updating information, and update the status information recorded by them according to the status information carried in the frame without request; Nodes S1 and S3 update the address forwarding table, forward these protocol frames to the control VLAN of Ring 1, and update the address forwarding table of the nodes on Ring 1.

Figure 5:
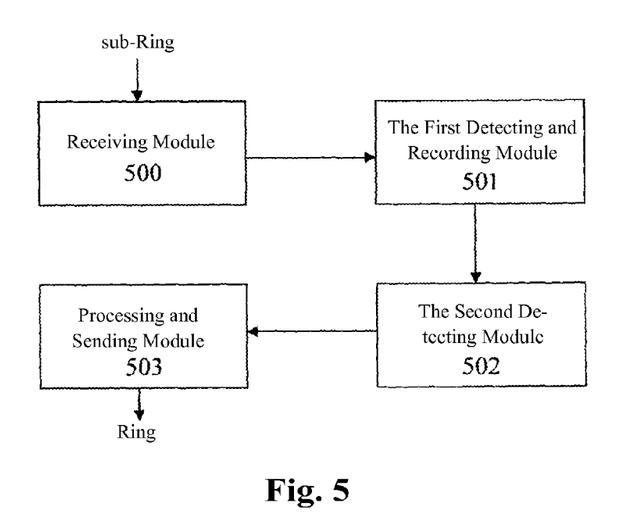
FIG. 5 is a structural schematic diagram of an interconnection node in the Embodiment 1 of the present invention.

As shown in FIG. 5, it is a structural schematic diagram of an interconnection node of the embodiments of the present invention, including: a first detecting and recording module 501, a second detecting module 502, a processing and sending module 503 and a receiving module 500; wherein, the receiving module 500 is configured to receive a protocol frame from the sub-ring control channel and inform the first detecting and recording module 501;

the first detecting and recording module 501 is configured to detect the status information carried in the protocol frame, and if the status information is not consistent with status information recorded lately by it, update the status information recorded by it according to the status information carried in the protocol frame, and inform the second detect module 502 of the protocol frame; if the status information is consistent with status information recorded lately by it, the first detecting and recording module 501 does not make any process;

the second detecting module 502 is configured to detect whether the protocol frame carries address updating information, if yes, inform the processing and sending module 503; if not, not make any process;

the processing and sending module 503 is configured to update the address forwarding table according to the address updating information, generate a new address updating message according to the protocol frame which carries the address updating information, and send the message to the ring for N times continuously, wherein N is greater than or equal to 3.

In summary, the invention provides an interconnection node and a new method of the sub-ring of a Ethernet ring network selectively sending address updating information of protocol frames to the ring, and the key idea thereof is as follows: if and only if the interconnection node receives a protocol frame carrying address updating information sent from a sub-ring and updates address forwarding table of the interconnection node according to the address updating information of the protocol frame, the interconnection node sends the address updating information of the sub-ring to the ring. By applying the method provided in the present invention, not only the problem of updating address in spanning rings can be solved, but also the amount of transmission of protocol frame on the ring can be decreased greatly. The method provided in the present invention can be applied to various protection techniques of Ethernet multi-ring networks.

Of course, the invention may have other various embodiments; in the situation of not departing from the spirit and essence of the invention, technical personnel skilled in the art can make various corresponding changes or transformations according to present invention, but all of these corresponding changes and transformations should belong to protection scope of the claims attached by the invention.

What is claimed is:

1. A method for forwarding a protocol frame in spanning rings, applied to the Ethernet ring network including a crossed or tangent ring and sub-ring, comprising: when an interconnection node of a ring and a sub-ring receives a protocol frame from a sub-ring, if the topology of the sub-ring is changed, the interconnection node updates its address forwarding table according to address updating information carried in the protocol frame, and sends the address updating information to the ring; and nodes of the ring update their address forwarding table respectively according the updating information, wherein that the topology of the sub-ring is changed means that status information carried in the protocol frame is not consistent with status information lately recorded by the interconnection nodes, wherein when the status information carried in the protocol frame received by the interconnection node is not consistent with the status information lately by the interconnection node, the interconnection node updates its recorded status information according to the status information carried in the protocol frame received, wherein when the status information carried in the protocol frame received by the interconnection node is not consistent with the status information recorded lately by the interconnection node and the protocol frame does not carry address updating information, the interconnection node ignores the protocol frame and does not forward the protocol frame to the ring, wherein if the status information carried in the protocol frame received by the interconnection node is consistent with recorded status information of previous protocol frame, the interconnection node does not forward information of the protocol frame of the sub-ring to the ring.

2. The method according to claim 1, wherein the interconnection node sends the address updating information to the ring by following manners:

the interconnection node generates an address updating message according to the address updating information, and sends the message to the ring for N times continuously, wherein, N is greater than or equals to 3.

3. The method according to claim 1, wherein the status information carried in the protocol frame indicates that a sub-ring is in normal status or fault status.

4. The method according to claim 1, wherein protocol frame of the ring and protocol frame of the sub-ring are transmitted on the ring control channel and sub-ring control channel respectively.

5. An interconnection node, applied to the Ethernet ring network which includes a crossed or tangent ring and a sub-ring, comprising: a first detecting and recording module, a second detecting module, a processing and sending module, and a receiving module; wherein, the receiving module is configured to inform the first detecting and recording module when receiving a protocol frame from a sub-ring control channel;

the first detecting and recording module is configured to detect status information carried in the protocol frame, if the status information is not consistent with status information recorded lately by the first detecting and recording module, updates its recorded status information according to the status information carried in the protocol frame, and informs the second detecting module of the protocol frame;

the second detecting module is configured to detect whether the protocol frame carries address updating information, if yes, inform the processing and sending module; and the processing and sending module is configured to update an address forwarding table according to the address updating information in the protocol frame, and sends the address updating information to the ring, wherein the first detecting and recording module does not make any process if detecting that the status information is consistent with its recorded status information of previous protocol frame, wherein the second detecting module does not make any process if detecting that the protocol frame does not carry the address updating information, wherein the first detecting and recording module learns that the sub-ring is in a normal status or a fault status by detecting status information carried in the protocol frame.

6. The interconnection node according to claim 5, wherein the interconnection node sends the address updating information to the ring by following manners:

the interconnection node generates an address updating message according to the address updating information, and sends the message to the ring for N times continuously, wherein, N is greater than or equals to 3.

* * * * *

UNITED STATES PATENT AND TRADEMARK OFFICE
CERTIFICATE OF CORRECTION

PATENT NO.        : 8,761,052 B2
APPLICATION NO.   : 13/119623
DATED             : June 24, 2014
INVENTOR(S)       : Bin Wang and Shaoyong Wu Page 1 of 1

It is certified that error appears in the above-identified patent and that said Letters Patent is hereby corrected as shown below:

In the CLAIMS:

Claim 1, Column 9, line 22 reads: "…with the status information lately by the…"

It should read: "…with the status information recorded lately by the…"

Signed and Sealed this
Second Day of September, 2014

Michelle K. Lee
*Deputy Director of the United States Patent and Trademark Office*